(12) United States Patent
Takahashi et al.

(10) Patent No.: US 7,803,432 B2
(45) Date of Patent: *Sep. 28, 2010

(54) METHOD OF CONTROLLING CONTACT ANGLE OF WATER

(75) Inventors: Junko Takahashi, Tsukuba (JP); Hidenori Nagai, Ikeda (JP); Shinichi Wakida, Ikeda (JP)

(73) Assignees: Daikin Industries, Ltd., Osaka (JP); National Institute of Advanced Industrial Science and Technology, Tokyo (JP)

( * ) Notice: Subject to any disclaimer, the term of this patent is extended or adjusted under 35 U.S.C. 154(b) by 1163 days.

This patent is subject to a terminal disclaimer.

(21) Appl. No.: 10/573,967

(22) PCT Filed: Oct. 1, 2004

(86) PCT No.: PCT/JP2004/014498

§ 371 (c)(1),
(2), (4) Date: Mar. 30, 2006

(87) PCT Pub. No.: WO2005/032706

PCT Pub. Date: Apr. 14, 2005

(65) Prior Publication Data

US 2007/0128416 A1        Jun. 7, 2007

(30) Foreign Application Priority Data

Oct. 3, 2003    (JP)    ............... 2003-345585

(51) Int. Cl.
*G21H 5/00*     (2006.01)
*B05D 5/00*     (2006.01)

(52) U.S. Cl. .............. 427/553; 137/825; 137/827; 137/828; 250/428; 250/432 R; 427/256; 427/532; 427/561

(58) Field of Classification Search ................ 137/825, 137/827, 828; 250/428, 432 R
See application file for complete search history.

(56) References Cited

U.S. PATENT DOCUMENTS 3,964,906 A  *  6/1976  Kenney  ............... 430/275.1

(Continued)

FOREIGN PATENT DOCUMENTS

DE            197 08 373 A1      10/1997

(Continued)

OTHER PUBLICATIONS

Machine Translation of JP 09-241405 (1997).*

*Primary Examiner*—Shamim Ahmed
(74) *Attorney, Agent, or Firm*—Sughrue Mion, PLLC

(57) ABSTRACT

The present invention fundamentally differs from conventional methods in which an external force is directly applied to a surface of an article to be modified, and relates to a method of hydrophobilization (increasing a contact angle of water) which comprises bringing a hydrophobilization substance (a substance for increasing a contact angle of water) released from a material of another location into contact with a surface of an article, especially an article surface being hydrophilic (having a small contact angle of water) in its initial state without applying an external force on the article surface, further a method of control being capable of noncontact switching of a contact angle of water, which comprises conducting hydrophilization of an article surface subjected to hydrophobilization by the above-mentioned method in a noncontact manner and repeating these hydrophobilization and hydrophilization, and a method of pattern formation using the mentioned methods. According to those methods, hydrophobilization and hydrophilization can be carried out in the noncontact manner, and by selecting a material, degrees of hydrophobilization and hydrophilization can be adjusted.

15 Claims, 9 Drawing Sheets

U.S. PATENT DOCUMENTS

| | | | |
|---|---|---|---|
| 5,296,122 A | 3/1994 | Katsube et al. | |
| 5,939,182 A * | 8/1999 | Huang et al. | 428/323 |
| 6,013,372 A | 1/2000 | Hayakawa et al. | |
| 6,352,758 B1 * | 3/2002 | Huang et al. | 428/143 |
| 2002/0012025 A1 * | 1/2002 | Lerat et al. | 347/54 |
| 2002/0016250 A1 * | 2/2002 | Hayakawa et al. | 502/5 |
| 2007/0034269 A1 * | 2/2007 | Nagai et al. | 137/827 |

FOREIGN PATENT DOCUMENTS

| | | |
|---|---|---|
| JP | 05-215905 A | 8/1993 |
| JP | 9-241405 A | 9/1997 |
| JP | 10-293201 A | 11/1998 |
| JP | 2001-180145 A | 7/2001 |
| WO | WO 03/037613 A1 | 5/2003 |

* cited by examiner (a)

(b)
ENERGY
(LIGHT, HEAT, ELECTROMAGNETIC WAVE)

(c)

(a) ULTRAVIOLET RAY (b) ENERGY (LIGHT, HEAT, ELECTROMAGNETIC WAVE)

(c)

(d) ULTRAVIOLET RAY (e)

(a)

(b)

METHOD OF CONTROLLING CONTACT ANGLE OF WATER

TECHNICAL FIELD

The present invention relates to a method of controlling a contact angle of water on a surface of an article and also relates to a method of forming various patterns by controlling a contact angle of water on an article surface.

The present invention can provide techniques useful in the fields of various sensor materials, environmentally responsible materials, various switching materials, printing technology and anti-fogging and stain-proof technologies.

BACKGROUND ART

Techniques of changing a contact angle of water on an article surface have been known for long. In the field of coating, there are known, for example, a technique of forming a coating film having a low contact angle of water from a hydrophilic coating, a technique of forming a coating film having a high contact angle of water from a hydrophobic coating, a technique of applying a water- and oil-repellent agent and the like. Those techniques are intended to fix an article surface to either of hydrophilic or hydrophobic permanently if possible.

With respect to techniques of changing a contact angle of water on an article surface by a method other than the above-mentioned methods of forming a film, there are known (1) a technique of forming a hydrophilic functional group on an article surface by applying energy such as corona discharge or plasma (JP2000-109580A), (2) a technique of making an article surface hydrophilic by irradiation of light to a photocatalytic semiconductor material (for example, titanium oxide and the like) being capable of making a state of the surface hydrophilic by irradiation of light (Japanese Patent No. 2756474 and No. 2865065), (3) a technique of changing a contact angle of water by adjusting a temperature of heat-sensitive resin (T. Saitoh et al., Analytical Science 18, 203 (2003)) and the like. Those techniques (1) to (3) are also intended to make a hydrophobic article surface hydrophilic (to decrease a contact angle of water) or reversely to make a hydrophilic article surface hydrophobic (to increase a contact angle of water).

Also a technique of making an article surface hydrophilic and hydrophobic alternately by changing a contact angle of water by applying external energy (JP2001-158606A). This technique is for making an article surface hydrophilic (decreasing a contact angle of water) by irradiation of light to a photocatalytic semiconductor material (for example, titanium oxide and the like) and then making the article surface hydrophobic again by applying a mechanical shock (friction force) on the surface. This patent publication says that switching to hydrophilic and hydrophobic can be conducted at high speed.

DISCLOSURE OF INVENTION (Problem to be Solved by the Invention)

The present invention fundamentally differs from the above-mentioned conventional methods in which an external force is applied directly to an article surface to be modified, and an object of the present invention is to provide a method of hydrophobilization (increasing a contact angle of water) which comprises bringing a hydrophobilization substance (a substance for increasing a contact angle of water) released from a material of another location into contact with an article surface, especially an article surface being hydrophilic (having a small contact angle of water) in its initial state without applying an external force on the article surface.

Further an another object of the present invention is to provide a method of control being capable of noncontact switching of a contact angle of water, which comprises conducting noncontact hydrophilization of the article surface subjected to hydrophobilization by the above-mentioned method and repeating these hydrophobilization and hydrophilization.

(Means to Solve the Problem)

Namely, the present invention relates to a method (the first invention) of controlling a contact angle of water on a hydrophilic surface of an article which comprises:

(1) a step for releasing a substance for increasing a contact angle of water which provides a surface having a contact angle of water larger than that of the hydrophilic surface of the article, from a material for controlling a contact angle of water which contains the substance for increasing a contact angle of water, and (2) a step for increasing the contact angle of water on the hydrophilic surface of the article by bringing the released substance for increasing a contact angle of water into contact with the surface of the article to adhere the substance to the surface of the article.

It is preferable that this means to release the substance for increasing a contact angle of water from the material for controlling a contact angle of water is application of energy.

Also the present invention relates to a method (the second invention) of controlling a contact angle of water on an article surface, in which the article surface is comprised of a substance being capable of decreasing a contact angle of water by application of energy and the method comprises:

(1) a step for releasing a substance for increasing a contact angle of water which provides a surface having a contact angle of water larger than that of the article surface, from a material for controlling a contact angle of water which contains the substance for increasing a contact angle of water, (2) a step for increasing the contact angle of water of the article surface by bringing the released substance for increasing a contact angle of water into contact with the article surface to adhere the substance to the article surface, and (3) a step for decreasing the contact angle of water on the article surface by applying energy to the article, to which the substance for increasing a contact angle of water was adhered.

The contact angle of water on the article surface can be controlled reversibly by repeating the above-mentioned steps (1) to (3).

Preferred as the energy to be applied are light energy, thermal energy or electromagnetic energy, and light energy is particularly preferred.

The material for controlling a contact angle of water which contains the substance for increasing a contact angle of water may comprise the substance for increasing a contact angle alone or may be a liquid or solid containing the substance for increasing a contact angle of water.

It is possible to selectively provide a hydrophilic portion and a hydrophobic portion by selectively applying energy to a specific region on the hydrophilic surface.

In the case that the energy to be applied is light energy or electromagnetic energy, the method of applying energy can be made selectively by changing a wavelength of light or electromagnetic wave or by changing an amount of applying energy.

In the case that the energy to be applied is light energy, it is possible to selectively provide a hydrophilic portion and a hydrophobic portion by selectively applying the light energy to a specific region of the hydrophilic surface through a light-shielding pattern.

With respect to means to selectively apply energy, preferred is irradiation of light or electromagnetic wave. Examples of light source are a laser generator, ultraviolet lamp, mercury lamp, etc.

When, for example, a method of adjusting a focus in the depth direction is adopted as a method of laser beam irradiation, it also becomes possible to apply energy to only inside of the article.

Preferred examples of the substance being capable of decreasing a contact angle of water by application of energy are substances having photocatalytic action, and, for example, titanium oxide is suitable.

Also polydimethylsiloxane containing a substance for increasing a contact angle of water is preferred as the material for controlling a contact angle of water.

There may be used, as the substance for increasing a contact angle of water, substances which are capable of adhering to or being deposited on a hydrophilic surface or chemically bonding thereto. There are concretely organosilicon compounds.

Also the present invention relates to a method (the third invention) of forming a pattern having a different contact angle of water on a sheet-like article having a hydrophilic surface, which comprises:
(1) a step for releasing a substance for increasing a contact angle of water which provides a surface having a contact angle of water larger than that of the hydrophilic sheet-like article, from a material for controlling a contact angle of water which contains the substance for increasing a contact angle of water, and
(2) a step for forming a portion having an increased contact angle of water by bringing the released substance for increasing a contact angle of water into contact with the surface of the sheet-like article with a mask pattern being placed between the substance for increasing a contact angle of water and the sheet-like article, to adhere the substance to the article surface in the form of pattern.

Further the present invention relates to a method (the fourth invention) of forming a pattern having a different contact angle of water on a sheet-like article having a hydrophilic surface, which comprises:
(1) a step for selectively releasing a substance for increasing a contact angle of water which provides a surface having a contact angle of water larger than that of the hydrophilic sheet-like article, from a material for controlling a contact angle of water which contains the substance for increasing a contact angle of water, by selectively applying energy to the material for controlling a contact angle of water through a mask pattern, and
(2) a step for forming a portion having an increased contact angle of water by bringing the selectively released substance for increasing a contact angle of water into contact with the surface of the sheet-like article to adhere the substance to the article surface in the form of pattern.

It is preferable that this means to release the substance for increasing a contact angle of water from the material for controlling a contact angle of water is a method of applying energy.

Also the present invention relates to a method (the fifth invention) of forming a pattern, in which a sheet-like article surface is comprised of a substance being capable of decreasing a contact angle of water by application of energy thereto and the method comprises:
(1) a step for releasing a substance for increasing a contact angle of water which provides a surface having a contact angle of water larger than that of the sheet-like article surface, from a material for controlling a contact angle of water which contains the substance for increasing a contact angle of water,
(2) a step for increasing a contact angle of water by bringing the released substance for increasing a contact angle of water into contact with the sheet-like article surface to adhere the substance for increasing a contact angle of water to the article surface, and
(3) a step for forming a pattern having a different contact angle of water by selectively applying energy through a mask pattern to the sheet-like article, to which the substance for increasing a contact angle of water was adhered, to decrease a contact angle of water on the energy-applied surface.

Preferred as the energy to be applied is light energy, thermal energy or electromagnetic energy. The material for controlling a contact angle of water which contains the substance for increasing a contact angle of water may comprise the substance for increasing a contact angle of water alone or may be a liquid or solid containing the substance for increasing a contact angle of water.

The sheet-like article is not limited particularly as far as its surface is hydrophilic. Examples thereof are, for instance, glass, glass coated with titanium oxide which was subjected to hydrophilization treatment and the like.

The present invention also relates to an article having, on its surface, a pattern formed by the above-mentioned methods of pattern formation, and further relates to a sensor chip substrate to be used for biochemical analysis which has, on its surface, a pattern formed by the above-mentioned methods of pattern formation.

Further the present invention relates to the mentioned methods of pattern formation, in which the sheet-like article is a starting material for a lithographic printing plate and the formed pattern is a printing pattern, and also relates to the lithographic printing plate having, on its surface, the pattern formed by the mentioned methods of pattern formation.

Also the present invention relates to a method (the sixth invention) of forming a pattern having a different contact angle of water on a sheet-like article having a hydrophilic surface, which comprises:
(1) a step for bringing the hydrophilic surface of the sheet-like article into close contact with a pattern made of a material for controlling a contact angle of water which contains a substance for increasing a contact angle of water which provides a surface having a contact angle of water larger than that of the sheet-like article,
(2) a step for releasing the substance for increasing a contact angle of water from the pattern made of the material for controlling a contact angle of water, and
(3) a step for forming a pattern having an increased contact angle of water by adhering the released substance for increasing a contact angle of water to the sheet-like article surface.

In this method of pattern formation, too, preferred means to release the substance for increasing a contact angle of water from the material for controlling a contact angle of water is a method of applying energy.

Further the present invention relates to a method (the seventh invention) of forming a pattern having a different contact angle of water on a sheet-like article having a surface made of a substance being capable of decreasing a contact angle of water by application of energy thereto, which comprises:

(1) a step for bringing the surface of the sheet-like article into close contact with a pattern made of a material for controlling a contact angle of water which contains a substance for increasing a contact angle of water which provides a surface having a contact angle of water larger than that of the sheet-like article, (2) a step for applying energy to the sheet-like article through the pattern made of the material for controlling a contact angle of water, and (3) a step for decreasing the contact angle of water on the surface of the energy-applied region of the sheet-like article and increasing the contact angle of water by releasing the substance for increasing a contact angle of water from the pattern made of the material for controlling a contact angle of water to adhere the substance for increasing a contact angle of water to the sheet-like article surface contacting the pattern made of the material for controlling a contact angle of water.

Preferred examples of energy to be applied are light energy, thermal energy and electromagnetic energy like the above-mentioned inventions.

It is particularly preferable that energy to be applied is light energy and the substance being capable of decreasing a contact angle of water is titanium oxide.

In the present invention, the terms "hydrophilic" and "hydrophobic" are not specified by an objective numerical contact angle of water and are used as a relative concept and therefore should not be construed absolutely by a contact angle of water. Namely, a state before carrying out the treatment for increasing a contact angle of water of the present invention is assumed to be "hydrophilic" and a state after the treatment is assumed to be "hydrophobic".

BEST MODE FOR CARRYING OUT THE INVENTION

Figure 1:
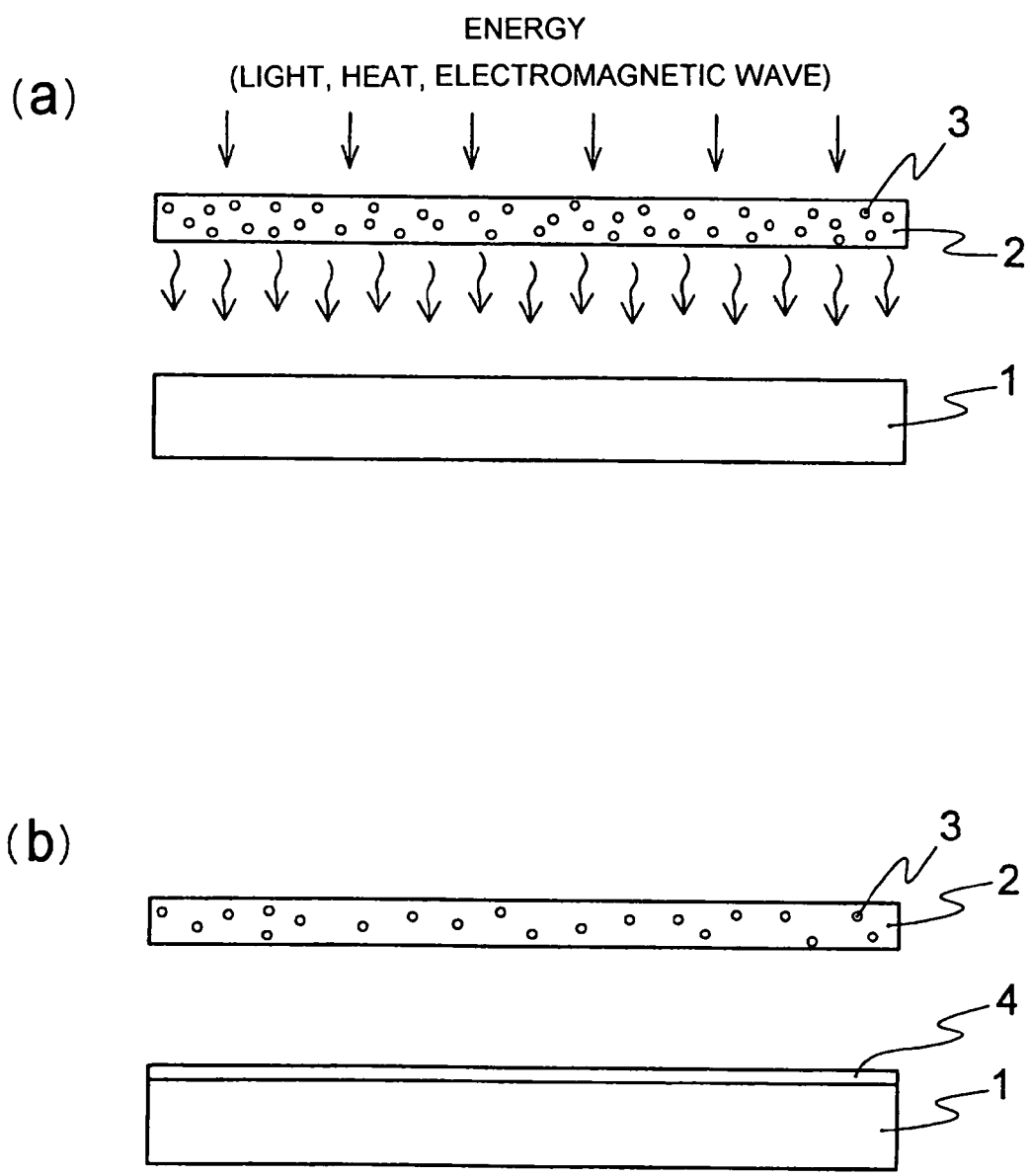
FIG. 1 is a diagrammatic cross-sectional view for explaining the steps of the first invention.

The basic concept of the present invention is to control a contact angle of water on a surface to be treated by treating the surface with a substance released from a material being different from a material of the surface. It is the above-mentioned first to seventh inventions that are obtained by realizing this basic concept. Each invention is then explained below.

The first of the present invention relates to the method (the first invention) of controlling a contact angle of water on a hydrophilic surface of an article which comprises:

(1) a step for releasing a substance for increasing a contact angle of water which provides a surface having a contact angle of water larger than that of the hydrophilic surface of the article, from a material for controlling a contact angle of water which contains the substance for increasing a contact angle of water (a releasing step), and (2) a step for increasing the contact angle of water on the hydrophilic surface of the article by bringing the released substance for increasing a contact angle of water into contact with the surface of the article to adhere the substance to the surface of the article (hydrophobilization step).

The article to be treated is not limited particularly, and may be an organic material or an inorganic material as far as its surface is hydrophilic. Also the article to be treated may be one subjected to surface treatment to have a hydrophilic surface. A degree of hydrophilicity may be selected depending on a contact angle of water after the hydrophobilization and purpose of application. The measure of the hydrophilicity is preferably not more than 30 degrees, further preferably not more than 20 degrees, particularly preferably not more than 10 degrees in a contact angle of water.

In the releasing step (1) of the first invention, the material for controlling a contact angle of water which contains the substance for increasing a contact angle of water which provides a surface having a contact angle of water larger than that of the hydrophilic surface of the article is used.

The substance for increasing a contact angle of water which is used in the releasing step (1) is not limited particularly as far as it provides a surface having a contact angle of water larger than that of the hydrophilic surface of the article. The substance may be an organic substance or an inorganic substance or may be a high molecular weight substance or a low molecular weight substance. Also the substance may be a liquid or a solid. Also a degree of increase in a contact angle of water (a contact angle of water of the surface provided by the substance) is a relative one and may be optionally selected depending on a contact angle of water on the article surface to be treated and purpose of application.

The contact angle of water increased by this substance for increasing a contact angle of water is not limited particularly, but it is desirable to select a substance which increases the contact angle of water by at least 5 degrees, preferably 20 degrees, further preferably 40 degrees to clearly discriminate between hydrophilicity and hydrophobicity.

It is the material for controlling a contact angle of water that contains this substance for increasing a contact angle of water and can release the substance. Such a material for controlling a contact angle of water is also selected optionally in relation to physical properties of the substance for increasing a contact angle of water. The material for controlling a contact angle of water also may be an organic material or an inorganic material and may be a liquid or a solid.

An amount of the substance for increasing a contact angle of water in the material for controlling a contact angle of water varies depending on kind of the substance, ease of releasing, a method of releasing, etc. and may be optionally selected.

The method of releasing the substance for increasing a contact angle of water from the material for controlling a contact angle of water is not limited particularly, and there are physical methods such as a method of applying vibration or pressure and a method of applying heat; chemical methods such as a method of chemical reaction and a method of extraction; and optical methods such as irradiation of light and electromagnetic wave. Particularly preferred releasing method is a method of applying energy.

Preferred as energy to be applied is light energy, thermal energy or electromagnetic energy (including electron beam) since energy can be applied in the noncontact manner.

Examples of light are ultraviolet ray (wavelength of from 200 to 420 nm), etc. A wavelength and strength of light to be used are optionally selected in relation to the substance for increasing a contact angle of water and the material for controlling a contact angle of water. Particularly preferred is ultraviolet ray from the viewpoint of a releasing rate of the substance for increasing a contact angle of water and easy manufacturing of device. Irradiation of ultraviolet ray may be carried out with an ultraviolet lamp or a mercury lamp and also may be in the form of laser beam.

With respect to heat, those generated from various heat sources can be used. Also heat can be generated by irradiation of infrared rays. Further a heat source may be embedded in the material for controlling a contact angle of water. A heating temperature and time may be optionally selected in relation to the substance for increasing a contact angle of water and the material for controlling a contact angle of water.

Examples of the electromagnetic wave are microwave, electron beam, γ-ray, X-ray and the like, which accelerate heat generation and excite a molecular motion to release the substance for increasing a contact angle of water.

The released substance for increasing a contact angle of water is brought into contact with the hydrophilic surface of the article in the following hydrophobilization step (2) and is adhered to the surface for hydrophobilization (increase in a contact angle of water).

The method of bringing the substance into contact with the article is not limited particularly, and natural phenomena such as diffusion and convection may be used or forced flowing may be adopted. When the substance for increasing a contact angle of water has been subjected to ionization, a voltage may be applied. A contact time may be optionally selected depending on an energy applying method to be used, kind of the material and substance and contacting method.

An adhering amount and adhesion state vary depending on purpose of application, kind of the article, kind and amount of the substance for increasing a contact angle of water, etc. and cannot be specified unconditionally. The substance may be applied all over the hydrophilic surface or may be applied partly.

Also the hydrophilic portion and hydrophobic portion can be selectively provided over the article surface by optionally selecting an adhering region. The adhering region may be selected, for example, by irradiating the substance for increasing a contact angle of water with energy through a mask pattern; irradiating the whole surface of the substance for increasing a contact angle of water with energy while providing a mask pattern between the substance for increasing a contact angle of water and the hydrophilic surface; or arranging the substance for increasing a contact angle of water only on necessary parts of a solid. Concrete explanation is made in the inventions mentioned infra.

The steps of the first invention are briefly explained diagrammatically according to FIG. 1. FIG. 1(a) shows the releasing step (1) and FIG. 1(b) shows a state after completion of the hydrophobilization step (2).

An embodiment is explained below by means of drawings using hydrophobic organosilane as the substance for increasing a contact angle of water, polydimethylsiloxane (PDMS) as the material for controlling a contact angle of water and ultraviolet ray as energy. The present invention is not limited to such an embodiment, and other embodiments can also be executed by changing the material, substance, applying energy, etc. to other ones if the concept of the present invention is followed.

FIG. 1(a) is a view for explaining the releasing step (1), and numeral 1 represents a glass article. The surface of this glass is hydrophilic, but in the case of a hydrophobic article, it is desirable to previously subject the article to hydrophilization treatment.

In FIG. 1(a), the material (PDMS) 2 for controlling a contact angle of water containing the substance (organosilane) 3 for increasing a contact angle of water is so arranged as to face to the hydrophilic surface of the article (glass) 1.

The releasing step (1) is initiated by applying energy to PDMS. The applying energy is not limited particularly, and energy enough for enabling organosilane to be released suffices. Preferred as the energy are light energy, thermal energy and electromagnetic energy. From the viewpoint of easy control, light energy, especially ultraviolet ray is preferred.

Organosilane 3 is released from the energy-applied material (PDMS) 2 for controlling a contact angle of water. The released organosilane comes into contact with the surface layer containing the material (PDMS) 2 for controlling a contact angle of water and titanium oxide and starts adhering to the surface. Thus the hydrophobic adhesion layer is formed (FIG. 1(b)).

Finally as shown in FIG. 1(b), the surface of the article 1 is partly or wholly covered with the hydrophobic adhesion layer 4 of organosilane to make the surface of the article 1 hydrophobic (completion of the hydrophobilization step).

Figure 2:
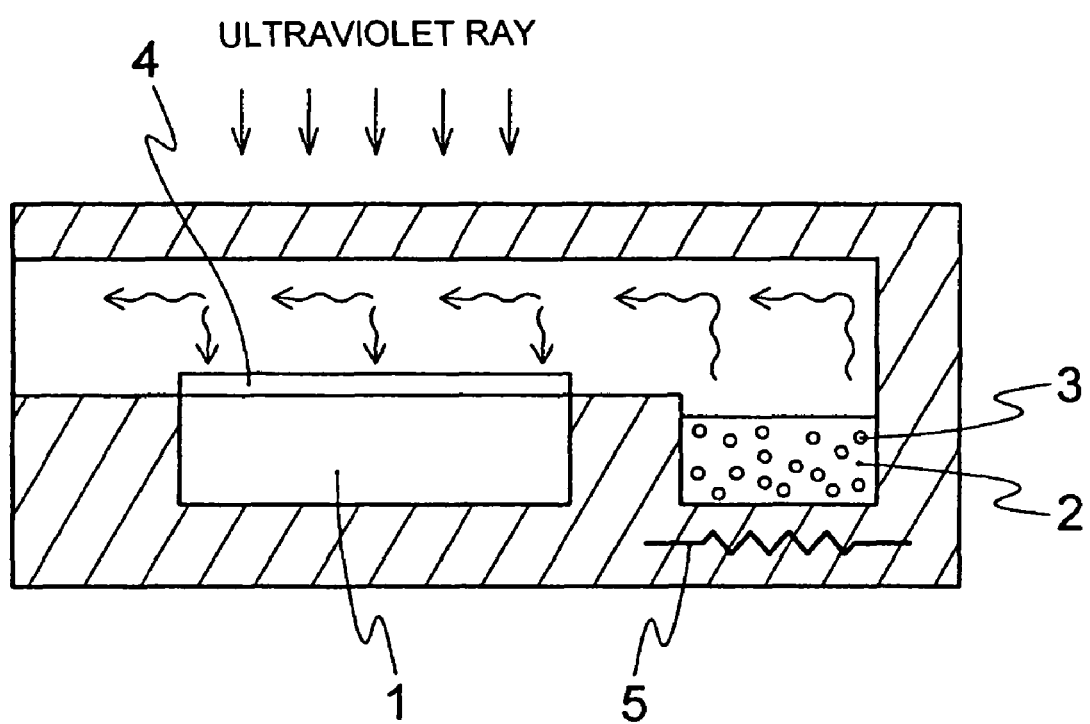
FIG. 2 is a diagrammatic cross-sectional view of an another embodiment for explaining the steps of the first invention.

In FIG. 1, the material 2 for controlling a contact angle of water and the article 1 to be treated are arranged faced to each other, but as shown in FIG. 2, the material 2 for controlling a contact angle of water may be shifted slightly apart from the article 1 without facing to each other. In this case, the releasing step (1) and the hydrophobilization step (2) can be carried out independently at separate places. Accordingly the releasing step (1) can be carried out by heating with a heater 5. Also a liquid material can be used as the material 2 for controlling a contact angle of water.

Further though not shown in the drawings, patterning of the hydrophobic portion can be carried out by arranging a patterned shielding sheet on the surface of the article 1 and selectively limiting the adhesion of the substance 3 for increasing a contact angle of water on the article surface. This method is explained in detail in the invention mentioned infra.

Nonlimiting examples of the article to be treated are organic materials, for instance, resins such as silicone resin (for example, polyorganosiloxane and the like), acrylic resin (for example, polyacrylate, polymethyl methacrylate and the like), polystyrene, polyolefin (for example, polyethylene, polypropylene and the like), polyester (polyethylene terephthalate and the like), polycarbonate (for example, polyisopropylidene diphenyl carbonate and the like), fluorine-containing resins (for example, polytrifluoroethylene, polytetrafluoroethylene and the like) and polyhexamethylene adipamide and elastomers such as silicone rubber and fluorine-containing rubber, and inorganic materials, for instance, glass, quartz, alumina and zirconia.

For the hydrophilization treatment of surface, there are known a technique of coating a hydrophilic substance, a technique of forming a hydrophilic functional group on a surface of an article by applying energy such as corona discharge and plasma directly or in the presence of ethyl acetate or the like and a technique of making an article surface hydrophilic by irradiation of light on a photocatalytic semiconductor material (for example, titanium oxide and the like) which can make a state of the article surface hydrophilic by irradiation of light. Those techniques can be applied to the present invention.

Nonlimiting examples of the substance for increasing a contact angle of water are, for instance, organosilicon compounds such as dimethylsiloxane terminated with dimethylvinyl group at its end (68083-19-2, CAS number, hereinafter the same), tetrakis(trimethylsilyloxy)silane (3555-47-3) and copolycondensation product of dimethylsiloxane and methylhydrosiloxane terminated with trimethylsilyl group at its end (68037-59-2); organic compounds which have hydrophilic group and hydrophobic group in one molecule such as ethylene glycol (107-21-1), catechol (120-80-9) and isovaleric acid aldehyde (590-86-3) and the like.

Nonlimiting examples of the material for controlling a contact angle of water are organic substances, for instance, organosilicon compounds such as polydimethylsiloxane.

Those substances and materials may be optionally selected depending on purpose of application and conditions in use, and used in combination thereof. Concrete embodiments are explained in the invention mentioned infra.

According to the first invention, the hydrophilic surface to be treated can be easily made hydrophobic in the noncontact manner without applying energy directly on the surface to be treated.

Next, the second invention is explained below. The second invention differs from the first invention in the point that the surface of the article to be treated is comprised of a substance being capable of decreasing a contact angle of water (a substance for decreasing a contact angle of water) by application of energy and that after the hydrophobilization step (2), a step (re-hydrophilization step (3)) for decreasing a contact angle of water of the article surface by applying energy on the article, to which the substance for increasing a contact angle of water was adhered, is carried out. Therefore conceptual explanation of the releasing step (1) and the hydrophobilization step (2) is omitted.

In the second invention, examples of the substance for decreasing a contact angle of water which constitutes the surface of the article to be treated are, for instance, photocatalytic semiconductor substances becoming hydrophilic by irradiation of light energy which are disclosed in Japanese Patent No. 2756474 and No. 2865065, and photo-sensitive resins becoming hydrophilic by irradiation of light energy. Especially when light energy is used as energy, photocatalytic semiconductor substances are preferred. Examples thereof are, for instance, anatase-type titanium dioxide, rutile-type titanium dioxide, stannic oxide, zinc oxide, dibismuth trioxide, tungsten trioxide, ferric oxide, strontium titanate and the like. Among them, titanium oxide, especially anatase-type titanium dioxide is preferred since the re-hydrophilization treatment (3) is easy.

For forming a surface layer of the substance for decreasing a contact angle of water, there can be adopted, for example, as disclosed in Japanese Patent No. 2756474 and No. 2865065, a sol/gel method, a chemical vapor deposition method and a method of dispersing in a binder such as silica or silicone resin.

When the obtained surface layer is hydrophilic (a low contact angle of water), the releasing step (1) may be carried out as it is, but in the case of being hydrophobic, known hydrophilization treatment may be carried out previously as case demands (pre-treatment for hydrophilization). For example, when titanium oxide is used, since the surface is hydrophobic (about 70 degrees of contact angle of water), irradiation of light energy (especially ultraviolet ray or ultraviolet laser) may be carried out previously to decrease a contact angle of water.

The feature of the second invention is that the surface subjected to hydrophobilization in the hydrophobilization step (2) is made hydrophilic in the re-hydrophilization step (3).

The re-hydrophilization step (3) is a step for subjecting the article surface to hydrophilization again by an action of the substance for decreasing a contact angle of water which constitutes the article surface, by applying energy on the surface of the article subjected to hydrophobilization. By repeating the steps (1) to (3), the article surface can be optionally controlled to change from hydrophilic to hydrophobic or from hydrophobic to hydrophilic.

The energy to be applied in the re-hydrophilization step (3) may be the same as or different from the energy to be applied in the releasing step (1). This is because in the releasing step (1), energy is applied to the material for controlling a contact angle of water. For example, thermal energy may be applied in the releasing step (1), and light energy may be applied in the re-hydrophilization step (3).

Kind and amount of energy to be applied in the re-hydrophilization step (3) may be optionally selected depending on kind of the substance for decreasing a contact angle of water, purpose of application and conditions in use.

An embodiment is explained below by means of drawings using titanium oxide as the substance for decreasing a contact angle of water, hydrophobic organosilane as the substance for increasing a contact angle of water, polydimethylsiloxane (PDMS) as the material for controlling a contact angle of water and ultraviolet ray as energy. The present invention is not limited to such an embodiment, and other embodiments can also be executed by changing the material, substance, applying energy, etc. to other ones if the concept of the present invention is followed.

Figure 3:
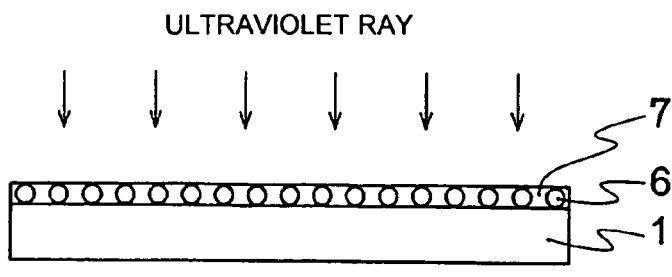
FIG. 3 is a diagrammatic cross-sectional view for explaining the steps of the second invention.
Figure 3:
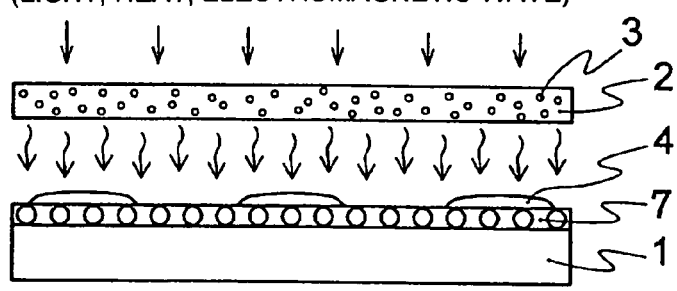
Figure 3:
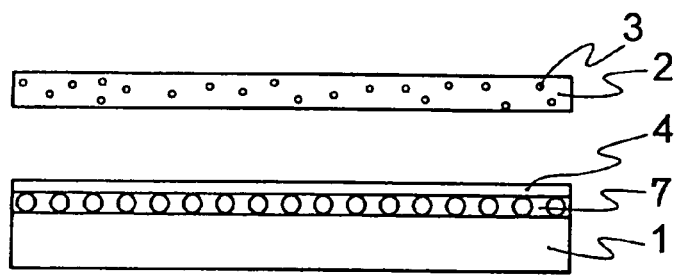
Figure 3:
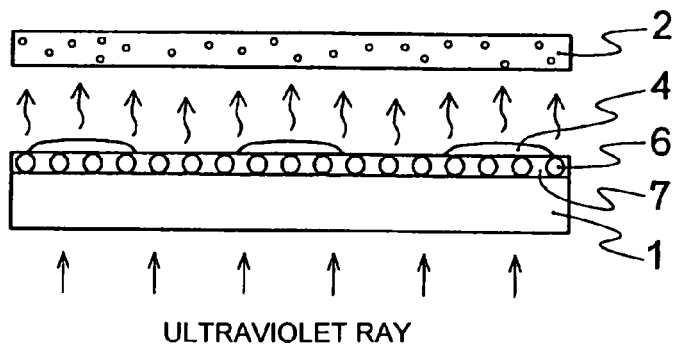
Figure 3:
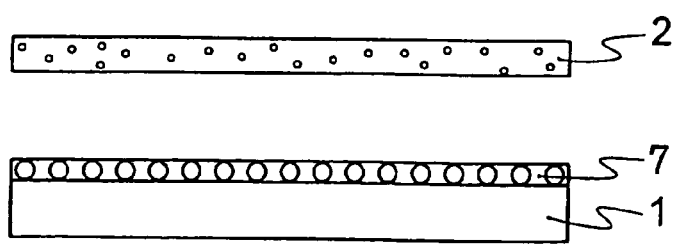

FIG. 3 is a process drawing diagrammatically showing the pre-treatment step for hydrophilization (FIG. 3(a)), releasing step (FIG. 3(b)), hydrophobilization step (FIG. 3(c)), re-hydrophilization step (FIG. 3(d)) and a state after the re-hydrophilization step (FIG. 3(e)).

In FIG. 3(a), numeral 1 represents a glass article, and a surface layer 7 comprising titanium oxide 6 is formed on its surface. This surface layer is inherently hydrophobic, and if necessary, is previously subjected to irradiation of ultraviolet ray to be hydrophilic. For making the surface hydrophilic, there is adopted the method disclosed in Japanese Patent No. 2756474 and No. 2865065.

FIG. 3(b) is a drawing for explaining the releasing step (1), and the material (PDMS) 2 for controlling a contact angle of water which contains the substance (organosilane) 3 for increasing a contact angle of water is so arranged as to face to the hydrophilic surface of the article (glass) 1.

The releasing step (1) is initiated by applying energy to PDMS. The applying energy is not limited particularly, and energy enough for enabling organosilane to be released suffices. Preferred as the energy are light energy, thermal energy and electromagnetic energy. From the viewpoint of easy control, light energy, especially ultraviolet ray is preferred.

Organosilane is released from the energy-applied material (PDMS) 2 for controlling a contact angle of water. The released organosilane comes into contact with the material (PDMS) 2 for controlling a contact angle of water and the surface layer 7 containing titanium oxide and adheres to the surface. Thus the hydrophobic adhesion layer 4 is formed (FIG. 3(b)).

Finally as shown in FIG. 3(c), the surface layer 7 of the article 1 is partly or wholly covered with the hydrophobic adhesion layer 4 of organosilane to make the surface of the article 1 hydrophobic (completion of the hydrophobilization step).

For re-hydrophilization of the article subjected to hydrophobilization, as shown in FIG. 3(d), light energy (irradiation of ultraviolet ray) is applied to the titanium oxide 6 in the surface layer 7 of the article from the side of the article 1 so that energy is not applied to PDMS, thereby making the titanium oxide exhibit a photocatalytic action. The catalytic action of the titanium oxide 6 is a photolysis action which quickly decomposes and removes the adhesion layer 4 of organosilane and returns the surface layer 7 to the hydrophilic state (FIG. 3(e)). When a confocal laser method is adopted as the irradiation method of light energy, irradiation may be carried out from the side of PDMS because the focus of the laser can be placed on the surface layer 7.

In this state (FIG. 3(e)), when the step of FIG. 3(b) and then the step of FIG. 3(c) are carried out, the hydrophobilization can be carried out again. The hydrophobilization of the surface layer 7 can be carried out repeatedly until the substance for increasing a contact angle of water is released no more.

In FIG. 3, the material 2 for controlling a contact angle of water and the article 1 to be treated are arranged faced to each other, but as shown in FIG. 2, the material 2 for controlling a contact angle of water may be shifted slightly apart from the article 1 without facing to each other. In this case, the releasing step (1) and the hydrophobilization step (2) can be carried out independently at separate places. Accordingly the releasing step (1) can be carried out by heating with a heater. Further in the re-hydrophilization step (3), since irradiation of ultraviolet ray can be carried out without minding the presence of the material for controlling a contact angle of water, undesirable releasing of the substance for increasing a contact angle of water can be avoided. Also a liquid material can be used as the material for controlling a contact angle of water.

Further patterning of the hydrophobic portion can be carried out by arranging a patterned shielding sheet on the surface layer 7 of the article and selectively limiting the adhesion of the substance 3 for increasing a contact angle of water on the surface layer 7. Also in the re-hydrophilization step (3), patterning of the re-hydrophilization portion can be carried out by selective irradiation of ultraviolet ray. Those methods are explained in detail in the invention mentioned infra.

According to the second invention, hydrophilization and hydrophobilization can be controlled alternately repeatedly. For example, in a method of controlling prevention of surface staining, the second invention is useful for a micro pipet where a contact angle of water inside its capillary part is controlled.

In the first and second inventions, for selectively forming the hydrophobic portion and the hydrophilic portion, there are a method of selectively limiting adhesion of the substance for increasing a contact angle of water and a method of selectively limiting the releasing of the substance for increasing a contact angle of water to selectively form the hydrophobic portion.

For example, when light energy is used as energy, the released substance for increasing a contact angle of water can be selectively adhered when a patterned shielding sheet is placed on the material 2 for controlling a contact angle of water to selectively limit a region to be irradiated with light and limit a portion releasing the substance for increasing a contact angle of water to the light-irradiated portion while the material for controlling the contact angle of water is placed close to the hydrophilic surface of the article 1.

The third invention relates to the method of pattern formation utilizing the control method of the first invention.

Namely, the third invention relates to the method of forming a pattern having a different contact angle of water on a sheet-like article having a hydrophilic surface, which comprises:

(1) a step for releasing a substance for increasing a contact angle of water which provides a surface having a contact angle of water larger than that of the hydrophilic sheet-like article, from a material for controlling a contact angle of water which contains the substance for increasing a contact angle of water (releasing step), and (2) a step for forming a portion having an increased contact angle of water by bringing the released substance for increasing a contact angle of water into contact with the sheet-like article surface with a mask pattern being placed between the substance for increasing a contact angle of water and the sheet-like article, to adhere the substance to the article surface in the form of pattern (step for forming hydrophobilization pattern).

In the third invention, the releasing step (1) of the first invention can be applied as it is to the above-mentioned step (1), and the hydrophobilization step (2) of the first invention can be applied as it is to the above-mentioned step for forming hydrophobilization pattern. The third invention differs from the first invention in the point that before the initiation of the releasing step (1), a mask pattern is arranged on the hydrophilic surface of the sheet-like article.

The mask pattern is not limited particularly. Either of a simple pattern and a complicated pattern will do. Also a region to be utilized may be either of a hydrophilic portion and a hydrophobic portion. A material of the mask may also be hydrophobic or hydrophilic, but since the releasing substance is hydrophobic, a mask made of a hydrophilic material is preferred from the viewpoint of reduction of an amount of the substance to be adhered to the mask. Concretely there are metallic sheets of copper and aluminum subjected to hydrophilization treatment.

Figure 4:
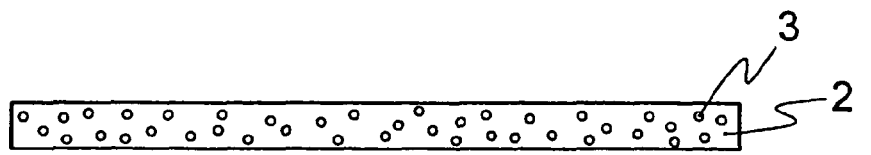
FIG. 4 is a diagrammatic cross-sectional view for explaining the steps of the third invention.
Figure 4:
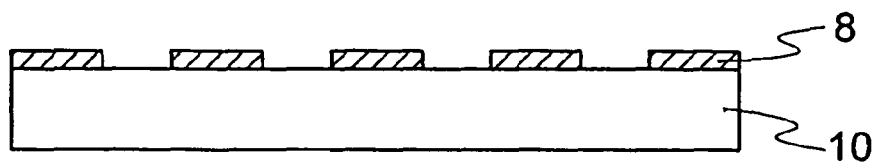
Figure 4:
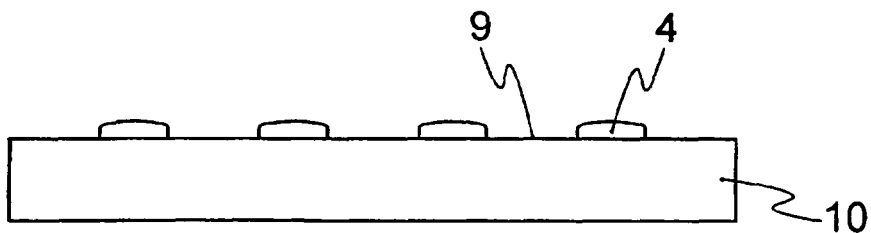

The third invention is briefly explained by means of FIG. 4. In FIG. 4, the same numerals as in FIG. 1 represent the same portions, and therefore explanation thereof is omitted.

FIG. 4(a) is a drawing showing that the mask pattern 8 is arranged on the surface of the sheet-like article 10 before starting of the releasing step (1). In this state, when the releasing step shown in FIG. 4(b) is started, the substance 3 for increasing a contact angle of water is released from the material 2 for control and adheres to the surfaces of the mask pattern and sheet-like article 10 to form a hydrophobic adhesion layer 4.

Then by removing the mask pattern 8, as shown in FIG. 4(c), a pattern of hydrophobic adhesion layer 4 corresponding to the mask pattern is formed on the sheet-like article 10. A portion 9 covered with the mask pattern on the sheet-like article 10 is left hydrophilic as it is.

As another embodiment of the third invention, a pattern can be formed when the mask pattern 8 is placed on the material 2 for controlling a contact angle of water but not on the sheet-like article 10 so that an energy (especially light energy) applying region is selectively controlled to release the substance 3 for increasing a contact angle of water from the energy-applied portion and adhere the selectively released substance 3 for increasing a contact angle of water to the sheet-like article 10.

Namely, the fourth invention relates to the method of forming a pattern having a different contact angle of water on a sheet-like article having a hydrophilic surface, which comprises:

(1) a step for selectively releasing a substance for increasing a contact angle of water which provides a surface having a contact angle of water larger than that of the hydrophilic sheet-like article, from a material for controlling a contact angle of water which contains the substance for increasing a contact angle of water, by selectively applying energy to the material for controlling a contact angle of water through a mask pattern (selectively releasing step), and (2) a step for forming a portion having an increased contact angle of water by bringing the selectively released substance for increasing a contact angle of water into contact with the sheet-like article surface to adhere the substance to the article surface in the form of pattern (selective hydrophobilization step).

In this case, the mask pattern 8 in the step (2) for forming hydrophobilization pattern of the third invention becomes unnecessary in principle, but may be used together when a pattern is made more precise. Also in this embodiment, diffusion of the released substance can be controlled by controlling a distance between the material for controlling a contact angle of water and the sheet-like article.

Figure 5:
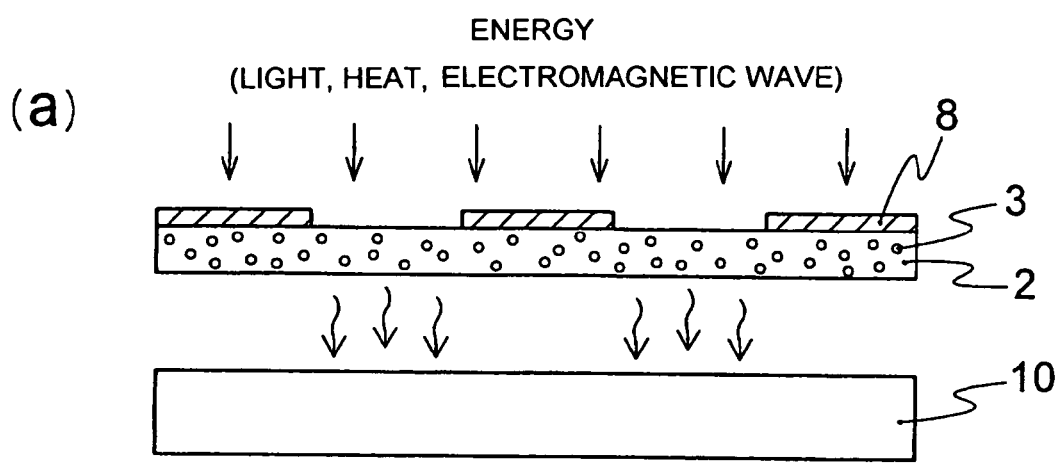
FIG. 5 is a diagrammatic cross-sectional view for explaining the steps of the fourth invention.
Figure 5:
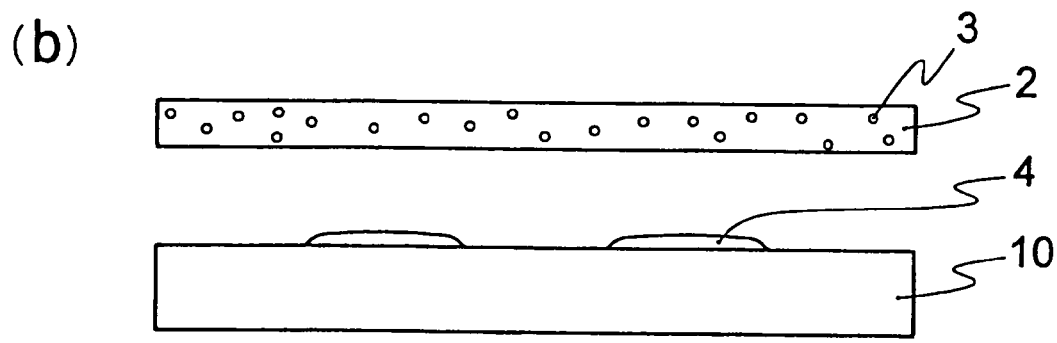

The fourth invention is then briefly explained by means of FIG. 5. In FIG. 5, the same numerals as in FIG. 1 represent the same portions, and therefore explanation thereof is omitted.

FIG. 5(*a*) is a drawing showing that the mask pattern 8 is arranged on the surface of the material 2 for controlling a contact angle of water before starting of the releasing step (1). In this state, when the material 2 for controlling a contact angle of water is irradiated with light, light is irradiated only at an opening portion of the mask pattern 8, and the substance 3 for increasing a contact angle of water is selectively released from the material 2 for control and comes into contact with the surface of the sheet-like article 10 and is adhered thereto, thereby forming a patterned hydrophobic adhesion layer 4 (FIG. 5(*b*)).

According to the third and fourth inventions, hydrophobic and hydrophilic patterns can be formed easily. Therefore those inventions are useful for limiting a reaction portion and a sample dropping portion on a sensor chip substrate for biochemical analysis and for forming a pattern of a probe on a DNA chip and protein chip.

The fifth invention relates to the method of pattern formation using the control method of the second invention.

Namely, the fifth invention relates to the method of forming a pattern, in which a sheet-like article surface is comprised of a substance being capable of decreasing a contact angle of water by application of energy thereto and the method comprises:

(1) a step for releasing a substance for increasing a contact angle of water which provides a surface having a contact angle of water larger than that of the sheet-like article surface, from a material for controlling a contact angle of water which contains the substance for increasing a contact angle of water (releasing step), (2) a step for increasing a contact angle of water by bringing the released substance for increasing a contact angle of water into contact with the sheet-like article surface to adhere the substance for increasing a contact angle of water to the sheet-like article surface (hydrophobilization step), and (3) a step for forming a pattern having a different contact angle of water by selectively applying energy through a mask pattern to the sheet-like article, to which the substance for increasing a contact angle of water was adhered, to decrease a contact angle of water on the energy-applied surface (step for forming a pattern for re-hydrophilization).

In the fifth invention, the releasing step (1) and the hydrophobilization step (2) of the second invention can be used as they are. The fifth invention differs from the second invention in the point that before initiating the re-hydrophilization step (3), the mask pattern is placed on the hydrophobic adhesion layer.

A material of the mask pattern is not limited particularly as far as it has property of shielding energy to be used for the re-hydrophilization. Either of a simple pattern and a complicated pattern will do. Also a region to be utilized may be either of a hydrophilic portion and a hydrophobic portion. When light, especially ultraviolet ray is used as the energy, concretely metallic sheets of copper and aluminum subjected to hydrophilization treatment are used as the material of the mask.

Figure 6:
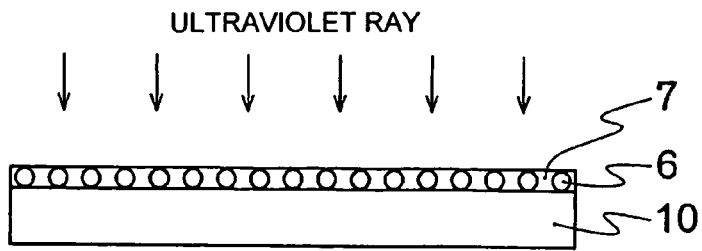
FIG. 6 is a diagrammatic cross-sectional view for explaining the steps of the fifth invention.
Figure 6:
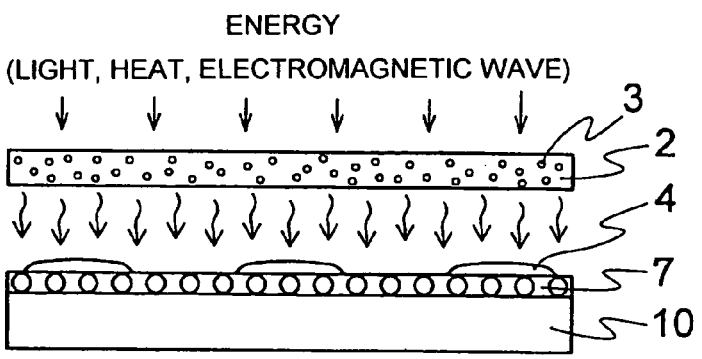
Figure 6:
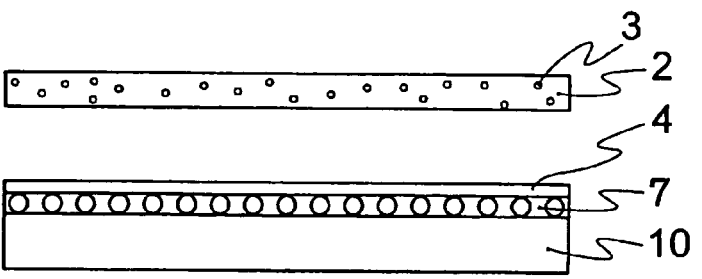
Figure 6:
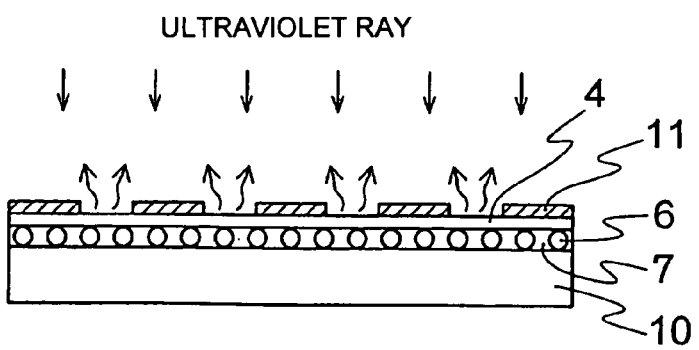
Figure 6:
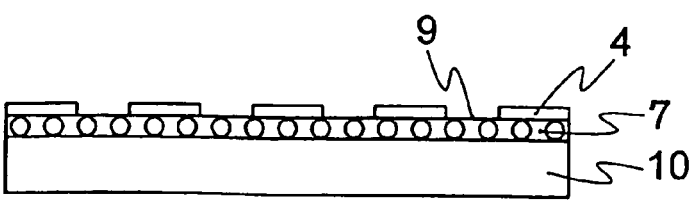

The fifth invention is then explained briefly by means of FIG. 6. In FIG. 6, the same numerals as in FIG. 3 represent the same portions, and therefore explanation thereof is omitted.

In FIG. 6, FIG. 6(*a*) to FIG. 6(*c*) are the same as FIG. 3(*a*) to FIG. 3(*c*), respectively, and therefore explanation thereof is omitted.

A mask pattern 11 being capable of shielding ultraviolet ray is placed on the surface layer 7 having the hydrophobic adhesion layer 4 obtained in FIG. 6(*c*) (FIG. 6(*d*)). In this state, ultraviolet ray is irradiated from the side of the surface layer 7. At that time, it is desirable that the material 2 for controlling a contact angle of water is removed before the irradiation.

The irradiated ultraviolet ray activates the titanium oxide 6 at the portion not shielded with the mask 11, and the hydrophobic adhesion layer 4 is decomposed and evaporated by its photocatalytic effect. An irradiation amount may be optionally selected depending on a releasing rate of the adhered substance, a photolysis rate and a distance between the material for controlling a contact angle of water and the hydrophobic portion or may be selected experimentally.

When the mask 11 is removed after sufficiently irradiating, as shown in FIG. 6(*e*), there is obtained the sheet-like article 10 in which the hydrophobic adhered substance 4 is left on the portion shielded with the mask and the portion 9 from which the adhered substance has been evaporated becomes hydrophilic.

The fifth invention has the merits that when changing a pattern, the whole adhered substances can be removed by irradiating ultraviolet ray all over the surface of the patterned sheet-like article shown in FIG. 6(*e*), and therefore the starting material shown in FIG. 6(*a*) can be obtained and re-used.

This fifth invention can be used effectively for production of plate for lithographic printing because the hydrophobic portion is compatible with a hydrophobic ink and the hydrophilic portion repels the hydrophobic ink.

The sixth invention relates to the method (transfer method) of forming a pattern by producing a mask pattern from a material for controlling a contact angle of water, bringing the mask pattern into close contact with a hydrophilic surface of an article, releasing a substance for increasing a contact angle of water and adhering the substance directly on the article.

Namely, the sixth invention relates to the method of forming a pattern having a different contact angle of water on a sheet-like article having a hydrophilic surface, which comprises:

(1) a step for bringing the hydrophilic surface of the sheet-like article into close contact with a pattern made of a material for controlling a contact angle of water which contains a substance for increasing a contact angle of water which provides a surface having a contact angle of water larger than that of the sheet-like article, (2) a step for releasing the substance for increasing a contact angle of water from the pattern made of the material for controlling a contact angle of water, and (3) a step for forming a pattern having an increased contact angle of water by adhering the released substance for increasing a contact angle of water to the sheet-like article surface.

Figure 7:
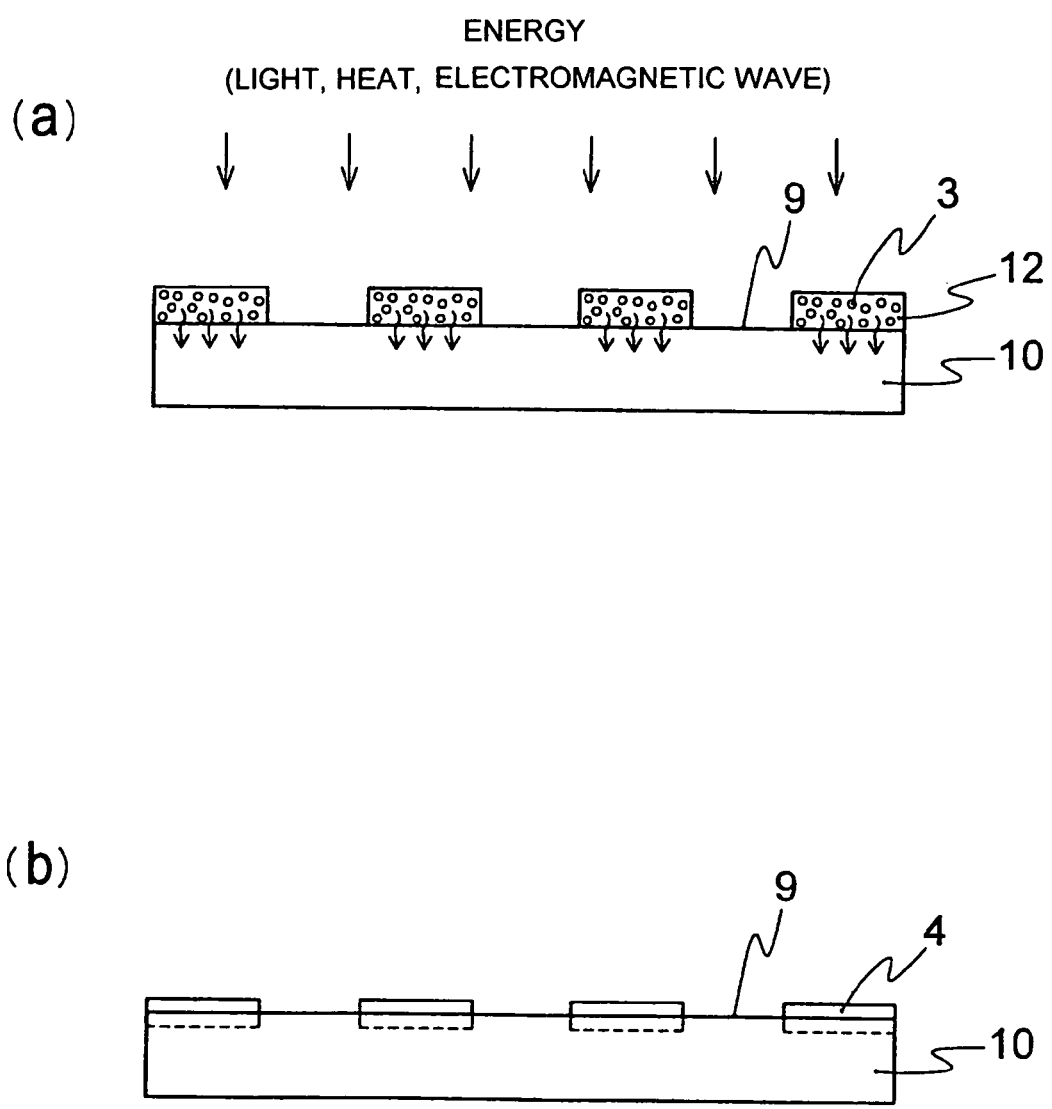
FIG. 7 is a diagrammatic cross-sectional view for explaining the steps of the sixth invention.

The sixth invention is then explained by means of FIG. 7. In FIG. 7, the same numerals as used supra represent the same portions. Also the method of releasing the substance for increasing a contact angle of water is the same as in the third invention and therefore explanation thereof is omitted.

The mask pattern 12 to be used in the sixth invention is made of the same material as the material for controlling a contact angle of water which is used in the first invention and contains the substance 3 for increasing a contact angle of water. The material is formed into a desired pattern. This mask pattern 12 is brought into close contact with the sheet-like article 10 (FIG. 7(a)). In this state, energy such as ultraviolet ray is applied to the mask pattern 12 and the sheet-like article 10 to release the substance 3 for increasing a contact angle of water from the mask pattern 12 directly to the sheet-like article 10 (FIG. 7(a)).

As a result, the substance for increasing a contact angle of water adheres only to the portion kept into contact with the mask 12 to form the hydrophobic adhesion layer 4. The portion 9 which is not covered with the mask pattern is left hydrophilic (FIG. 7(b)). There is a case where the substance for increasing a contact angle of water partly penetrates under the surface of the sheet-like article 10.

In the sixth invention, a more precise pattern can be formed by bringing the mask pattern into close contact with the sheet-like article.

The steps of the seventh invention are the same as in the sixth invention except that an article provided with a surface layer of a substance (titanium oxide and the like) for decreasing a contact angle of water is used as the sheet-like article. In the sixth invention, the surface of the sheet-like article need be hydrophilic, but in the seventh invention, formation of the hydrophobic adhesion layer and hydrophilization of the hydrophobic surface layer can be carried out at the same time.

Namely, the seventh invention relates to the method of forming a pattern having a different contact angle of water on a sheet-like article having a surface comprised of a substance being capable of decreasing a contact angle of water by application of energy thereto, which comprises:

(1) a step for bringing the surface of the sheet-like article into close contact with a pattern made of a material for controlling a contact angle of water which contains a substance for increasing a contact angle of water which provides a surface having a contact angle of water larger than that of the sheet-like article, (2) a step for applying energy to the sheet-like article through the pattern made of a material for controlling a contact angle of water, and (3) a step for decreasing the contact angle of water of the energy-applied region on the surface of the sheet-like article and increasing the contact angle of water by releasing the substance for increasing a contact angle of water from the pattern made of the material for controlling a contact angle of water to adhere the substance for increasing a contact angle of water to the sheet-like article surface contacting the pattern made of the material for controlling a contact angle of water.

Figure 8:
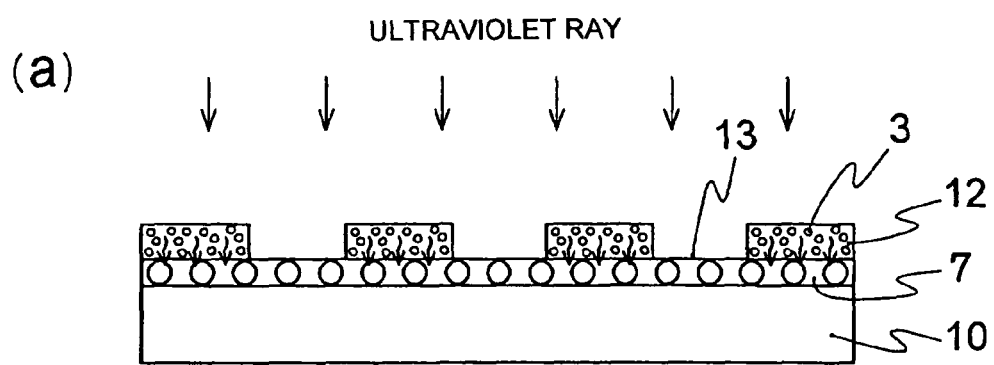
FIG. 8 is a diagrammatic cross-sectional view for explaining the steps of the seventh invention.
Figure 8:
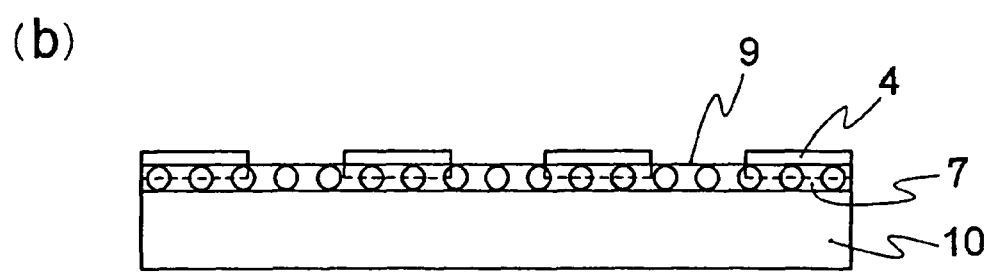

The seventh invention is then explained by means of FIG. 8. In FIG. 8, the same numerals as used supra represent the same portions.

In FIG. 8(a), the surface 13 on the surface layer (titanium oxide coating layer) 7 is hydrophobic. The mask pattern 12 of the sixth invention which is made of the material for controlling a contact angle of water is brought into close contact with this surface layer 7, and then ultraviolet ray causing titanium oxide to exhibit a photocatalytic action is irradiated all over the surface of the sheet-like article 10. By this irradiation, the substance 3 for increasing a contact angle of water is released from the mask pattern 12 and adheres directly to the surface layer 7. Titanium oxide at the portion 13 which is not covered with the mask 12 is excited to make the hydrophobic surface hydrophilic.

As a result, after removing the mask, as shown in FIG. 8(b), the hydrophobic adhesion layer 4 and the hydrophilic surface portion 9 are formed to the mask pattern.

This seventh invention has the merits that even if the sheet-like article surface is hydrophobic, hydrophilic and hydrophobic patterns can be formed by one step, and in the case of changing a pattern, by irradiating the whole pattern of FIG. 8(b) with ultraviolet ray, hydrophobic adhered substance can be decomposed and removed by a photolysis action of titanium oxide and the sheet-like article can be re-used.

The first to seventh inventions can be applied, in addition to the mentioned uses, for example, to a DNA chip and protein chip as a sensor material and also there is a possibility of application to an environmentally responsible material and anti-fogging and stain-proof materials.

EXAMPLE

The present invention is then explained by means of examples, but is not limited to them.

Example 1

An experiment for hydrophobilization was carried out according to the embodiment shown in FIG. 1.

Namely, a two-liquid silicone elastomer composition (SYLGARD 184 available from Dow Corning) comprising solutions A and B was used as a material for controlling a contact angle of water. The solutions were mixed in a ratio of A:B of 10:1 (weight ratio) and were allowed to stand for 24 hours or heated at 70° C. for one hour in a thermostatic chamber to produce a 3 mm thick PDMS sheet.

Solution A:

Component A-1: Dimethylsiloxane terminated with dimethylvinyl group at its end

Component A-2: Silica subjected to dimethylvinylation or trimethylation

Component A-3: Tetrakis(trimethylsilyloxy)silane

Solution B:

Component B-1: Copolycondensation product of dimethylsiloxane and methylhydrosiloxane terminated with trimethylsilyl group at its end Component B-2: 2,4,6,8-Tetramethyltetravinylcyclotetrasiloxane Component B-3: Silica subjected to dimethylvinylation or trimethylation (same as Component A-2)

Component B-4: Dimethylsiloxane terminated with dimethylvinyl group at its end (same as Component A-1)

Separately a quartz substrate coated with titanium oxide in a thickness of 500 nm by vapor deposition was irradiated with ultraviolet ray (black light of wavelength of 254 nm and 8 W of light source) at room temperature (25° C.) for 10 minutes with an ultraviolet lamp (Spectroline ENF280C available from Spectronics Corp.) to make the surface of titanium oxide coating hydrophilic. A contact angle of water measured with a contact angle meter (contact angle meter CA-A available from Kyowa Kaimen Kagaku Kabushiki Kaisha) was not more than five degrees.

Next, the quartz substrate coated with titanium oxide which had been subjected to hydrophilization treatment was put into a Petri dish, and a PDMS sheet was put on the substrate while a 4 mm spacer was put between them.

After irradiation of ultraviolet ray of a wavelength of 254 nm on this Petri dish for 10 minutes with an ultraviolet lamp, a glass plate was taken out. The contact angle of water of the top surface thereof measured with the above-mentioned contact angle meter had been increased to about 20 degrees.

Only the PDMS sheet was subjected to ultraviolet ray irradiation in a glass test tube under the same conditions as in the above experiment, and according to a gas chromatography analysis of the released substance, much amounts of A-1 component and A-3 component were detected.

The gas chromatography was carried out under the following conditions.

Equipment: Mass spectrometer GCMS-QP200GF/GC-14A for gas chromatography (available from Shimadzu Corporation)
Column: DB-1 (available from J&W Scientific Inc.)
Measuring condition: Ionization voltage 70 eV (Ionization method: EI)

Example 2

An experiment for hydrophobilization was carried out according to an embodiment shown in FIG. 2.

Namely, a sheet-like article 1 having a hydrophilic surface was put in a polystyrene Petri dish of 90 mm diameter a small vessel containing 100 μl of material for controlling a contact angle of water (solution B of the silicone elastomer composition used in Example 1) was put in the same Petri dish and the dish was covered. After the whole Petri dish was irradiated with ultraviolet ray (wavelength of 254 nm) at room temperature (25° C.) for 10 minutes with an ultraviolet lamp, the glass plate was taken out. The contact angle of water of the top surface thereof measured with the contact angle meter had been increased to about 50 degrees.

The sheet-like article 1 was as follows.

Sheet-like article 1: Slide glass (matunami S-1111 available from Matsunami Glass Kogyo Kabushiki Kaisha) having a surface subjected to washing with ethanol to make the surface hydrophilic (contact angle of water: about 30 degrees)

Example 3

Irradiation of ultraviolet ray was carried out for 10 minutes in the same manner as in Example 2 except that the following sheet-like article 2 was used. The contact angle of water was increased to about 20 degrees.

Sheet-like article 2: A quartz substrate coated with titanium oxide in a thickness of 500 nm by vapor deposition and irradiated with ultraviolet ray (wavelength of 254 nm) at room temperature (25° C.) for 10 minutes with an ultraviolet lamp (Spectroline ENF280C available from Spectronics Corp.) to make the surface of titanium oxide coating hydrophilic (contact angle of water: not more than 5 degrees)

Comparative Example 1

In Examples 2 and 3, the solution B was not irradiated with ultraviolet ray and was allowed to stand for 10 minutes. The contact angles of water of both of the sheet-like articles 1 and 2 were not changed.

Comparative Example 2

In Examples 2 and 3, irradiation of ultraviolet ray was carried out for 10 minutes without using the solution B. The contact angles of water of both of the sheet-like articles 1 and 2 were not changed.

Example 4

Table 1 shows a change of contact angle of water in the case of using, as the material for controlling a contact angle of water, dimethylsiloxane terminated with dimethylvinyl group at its end (68083-19-2), tetrakis(trimethylsilyloxy)silane (3555-47-3), copolycondensation product of dimethylsiloxane and methylhydrosiloxane terminated with trimethylsilyl group at its end (68037-59-2), ethylene glycol (107-21-1), catechol (120-80-9) and isovaleric aldehyde (590-86-3), respectively and irradiating light for 30 minutes in Example 3. The sheet-like article used was the sheet-like article 2, and the contact angle of water before the treatment was not more than 5 degrees.

TABLE 1

| | Material for controlling a contact angle of water | Light irradiation time 30 minutes |
|---|---|---|
| 1 | Dimethylsiloxane terminated with dimethylvinyl group at its end (68083-19-2) | 50.0 degrees |
| 2 | Tetrakis(trimethylsilyloxy)silane (3555-47-3) | 13.7 degrees |
| 3 | Copolycondensation product of dimethylsiloxane and methylhydrosiloxane terminated with trimethylsilyl group at its end (68037-59-2) | 13.7 degrees |
| 4 | Ethylene glycol (107-21-1) | 11.4 degrees |
| 5 | Catechol (120-80-9) | 10.6 degrees |
| 6 | Isovaleric aldehyde (590-86-3) | 26.8 degrees |

Example 5

In Example 1, a quartz substrate coated with titanium oxide and subjected to hydrophilization treatment was used as a sheet-like article, and a PDMS sheet was subjected to heating at 70° C. for 10 minutes in a thermostatic chamber instead of ultraviolet ray irradiation. As a result, the contact angle of water was increased to about 50 degrees.

Only the PDMS sheet was subjected to heat treatment in a glass test tube under the same conditions as in the above experiment, and according to a gas chromatography analysis of the released substance, much amount of A-1 component was detected.

Example 6

The hydrophobic quartz substrate coated with titanium oxide which was obtained in Example 1 was subjected to re-hydrophilization by irradiating with ultraviolet ray (254 nm) for 10 minutes. The contact angle of water was decreased to 5 degrees and the substrate was returned to an initial state.

The quartz substrate subjected to re-hydrophilization was made hydrophobic again by irradiation of ultraviolet ray on the PDMS sheet in the same manner as in Example 1. The contact angle of water was increased to 20 degrees, and the hydrophilization and hydrophobilization could be repeated.

Example 7

The hydrophobic quartz substrate coated with titanium oxide which was obtained in Example 3 was subjected to re-hydrophilization by irradiating with ultraviolet ray (254 nm) for 10 minutes. The contact angle of water was decreased to 5 degrees and the substrate was returned to an initial state.

The quartz substrate subjected to re-hydrophilization was made hydrophobic again by irradiation of ultraviolet ray on the solution B of the silicone elastomer composition in the same manner as in Example 3. The contact angle of water was increased to 20 degrees, and the hydrophilization and hydrophobilization could be repeated.

Example 8

Figure 9:
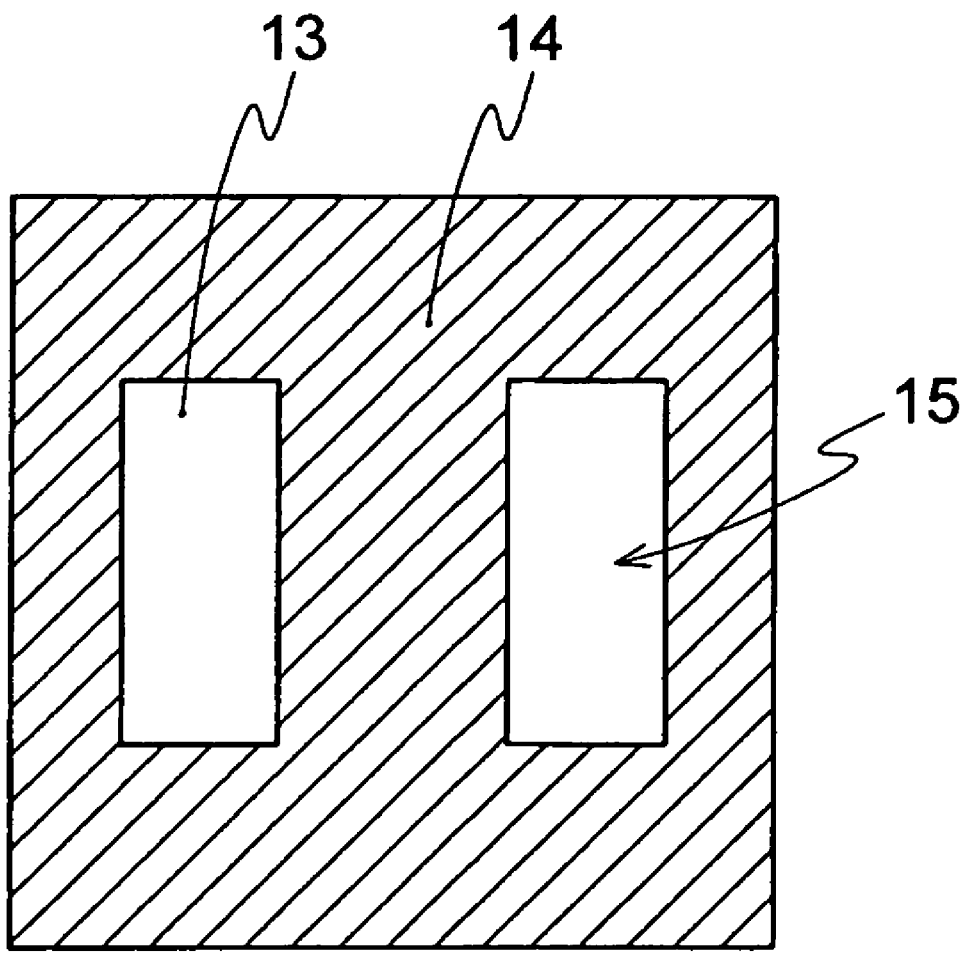
FIG. 9 is a plan view of a light-shielding sheet used in Example 8.

In Example 1, a light-shielding sheet in the form shown in FIG. 9 (50 mm square, opening portion: 10×30 mm, distance between the opening portions: 20 mm) was placed on the PDMS sheet, and the PDMS sheet was irradiated with ultraviolet ray for 30 minutes through the light-shielding sheet. The contact angle of water in the regions on the titanium oxide-coated quartz substrate which were located directly under the opening portions 13 and 15 was about 30 degrees, and the contact angle of water in the region on the titanium oxide-coated quartz substrate which was located directly under the shielded portion 14 was not more than 5 degrees.

INDUSTRIAL APPLICABILITY

According to the present invention, hydrophilization and hydrophobilization can be carried out in a noncontact manner, and by selecting a material, degrees of hydrophilization and hydrophobilization can be adjusted.

Also regions to be subjected to hydrophilization and hydrophobilization can be selected within a range of from a micro region to a macro region by selecting an applying energy and a distance between the substance for increasing a contact angle of water and the article (or a sheet-like article).

The invention claimed is:

1. A method of controlling a contact angle of water on a surface of an article, in which the article surface is comprised of a substance being capable of decreasing a contact angle of water by application of energy and the method comprises:
   (1) a step for releasing a substance for increasing a contact angle of water which provides a surface having a contact angle of water larger than that of the article surface, from a material for controlling a contact angle of water which contains the substance for increasing a contact angle of water,
   (2) a step for increasing the contact angle of water of the article surface by bringing the released substance for increasing a contact angle of water into contact with the article surface to adhere the substance to the article surface, and
   (3) a step for decreasing the contact angle of water on the article surface by applying energy to the article to which the substance for increasing a contact angle of water was adhered to release the substance for increasing a contact angle from the article.

2. The method of control of claim 1, wherein the contact angle of water on the article surface is controlled reversibly by repeating said steps (1) to (3).

3. The method of control of claim 1, wherein the substance being capable of decreasing a contact angle of water by application of energy is a substance having photocatalytic action.

4. The method of control of claim 1, wherein the energy to be applied is light energy, thermal energy or electromagnetic energy.

5. The method of control of claim 1, wherein the material for controlling a contact angle of water which contains the substance for increasing a contact angle of water comprises the substance for increasing a contact angle of water alone or is a liquid or solid containing the substance for increasing a contact angle of water.

6. The method of control of claim 1, wherein a hydrophilic portion and a hydrophobic portion are selectively provided by selectively applying the energy to a specific region on the hydrophilic surface.

7. The method of control of claim 6, wherein the energy to be applied is light energy or electromagnetic energy, and the energy is selectively applied by changing a wavelength of light or electromagnetic wave.

8. The method of control of claim 6, wherein the energy is selectively applied by changing an amount of the applying energy.

9. The method of control of claim 6, wherein the energy to be applied is light energy and the light energy is applied selectively to a specific region on the hydrophilic surface through a light-shielding pattern to selectively provide a hydrophilic portion and a hydrophobic portion.

10. The method of control of claim 6, wherein means to selectively apply energy is irradiation of light.

11. The method of control of claim 10, wherein a light source is a laser generator, an ultraviolet lamp or a mercury lamp.

12. The method of control of claim 10, wherein the method of light irradiation is an irradiation method being capable of changing a focus in the depth direction.

13. The method of control of claim 6, wherein means to selectively apply energy is irradiation of electron beam.

14. The method of control of claim 1, wherein the material for controlling a contact angle of water is polydimethylsiloxane containing the substance for increasing a contact angle of water.

15. The method of control of claim 1, wherein the substance for increasing a contact angle of water is an organosilicon compound.

* * * * *

UNITED STATES PATENT AND TRADEMARK OFFICE
CERTIFICATE OF CORRECTION

| | |
|---|---|
| PATENT NO. | : 7,803,432 B2 |
| APPLICATION NO. | : 10/573967 |
| DATED | : September 28, 2010 |
| INVENTOR(S) | : Junko Takahashi, Hidenori Nagai and Shinichi Wakida |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1163 days.

Signed and Sealed this
Twenty-fifth Day of January, 2011

David J. Kappos
*Director of the United States Patent and Trademark Office*